(12) United States Patent
Duelli et al.

(10) Patent No.: US 8,132,782 B2
(45) Date of Patent: Mar. 13, 2012

(54) METHOD FOR CONTROLLING OR REGULATING A VACUUM VALVE

(75) Inventors: Bernhard Duelli, Ubersaxen (AT); Friedrich Geiser, Nuziders (AT)

(73) Assignee: VAT Holding AG, Haag (CH)

( * ) Notice: Subject to any disclaimer, the term of this patent is extended or adjusted under 35 U.S.C. 154(b) by 136 days.

(21) Appl. No.: 12/688,235

(22) Filed: Jan. 15, 2010

(65) Prior Publication Data

US 2010/0108151 A1    May 6, 2010

Related U.S. Application Data

(63) Continuation of application No. PCT/AT2008/000263, filed on Jul. 21, 2008.

(30) Foreign Application Priority Data

Jul. 24, 2007  (DE) .......................... 10 2007 034 926

(51) Int. Cl.
 *F16K 29/00* (2006.01)
(52) U.S. Cl. ........................................ 251/193; 251/326
(58) Field of Classification Search .................. 251/193, 251/326, 327, 328, 329
See application file for complete search history.

(56) References Cited

U.S. PATENT DOCUMENTS

| | | |
|---|---|---|
| 4,052,036 A | 10/1977 | Schertler |
| 4,470,576 A | 9/1984 | Schertler |
| 4,634,094 A | 1/1987 | Geiser |
| 4,809,950 A | 3/1989 | Geiser |
| 4,921,213 A | 5/1990 | Geiser |
| 6,073,655 A | 6/2000 | Thompson et al. |
| 6,367,770 B1 | 4/2002 | Duelli |
| 6,431,518 B1 | 8/2002 | Geiser |
| 6,494,434 B1 | 12/2002 | Geiser |
| 6,685,163 B2 | 2/2004 | Blecha |
| 7,036,794 B2 | 5/2006 | Duelli et al. |
| 2002/0088959 A1 | 7/2002 | Duelli |
| 2004/0000659 A1 | 1/2004 | Geiser |

FOREIGN PATENT DOCUMENTS

| | | |
|---|---|---|
| DE | 4023845 | 4/1991 |
| JP | 2007146908 | 8/2007 |

*Primary Examiner* — John Fristoe, Jr.
(74) *Attorney, Agent, or Firm* — Volpe and Koenig, P.C.

(57) ABSTRACT

A method for controlling or regulating a vacuum valve that includes: a valve body (1) with a valve opening (2); a closing member (3) that can be moved between an open position and a closed position over a closing path (s) for closing the vacuum valve and that closes the valve opening (2) in the closed position, in which at least one elastic seal (4) is pressed onto a seal face (35); an actuator (5) for moving the closing member (3); and a control device (9) by which the actuator (5) can be triggered; the point (p) of the closing path (s) at which the elastic seal (4) contacts the seal face (35) and/or a velocity (v) of the closing member (3) at that point is used as a controlling parameter for the control device (9).

15 Claims, 4 Drawing Sheets

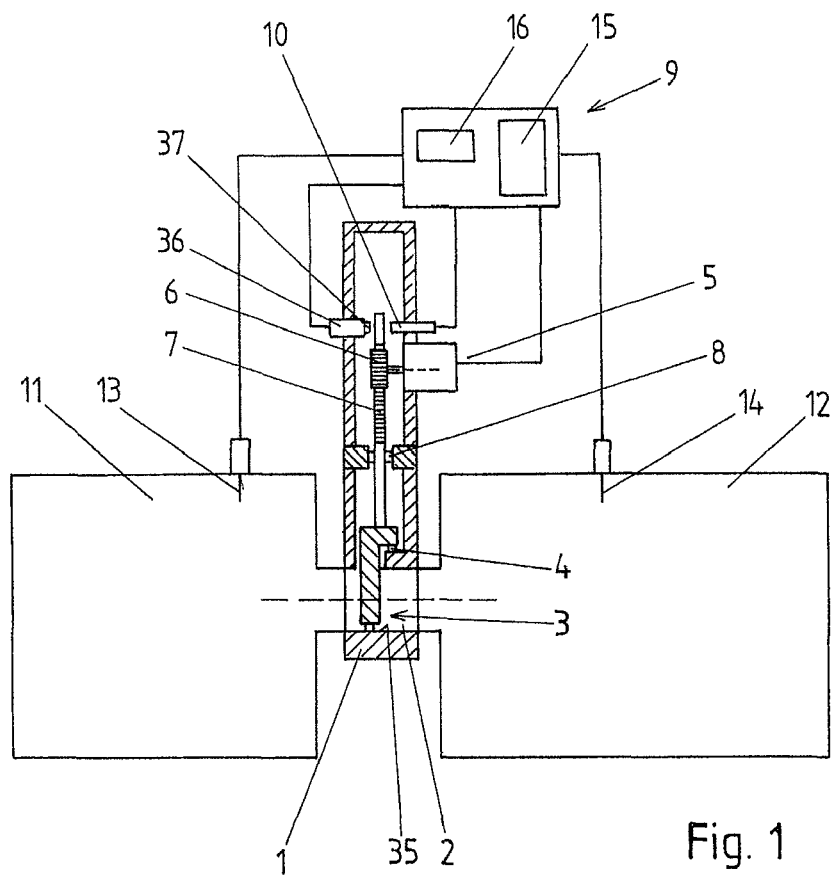
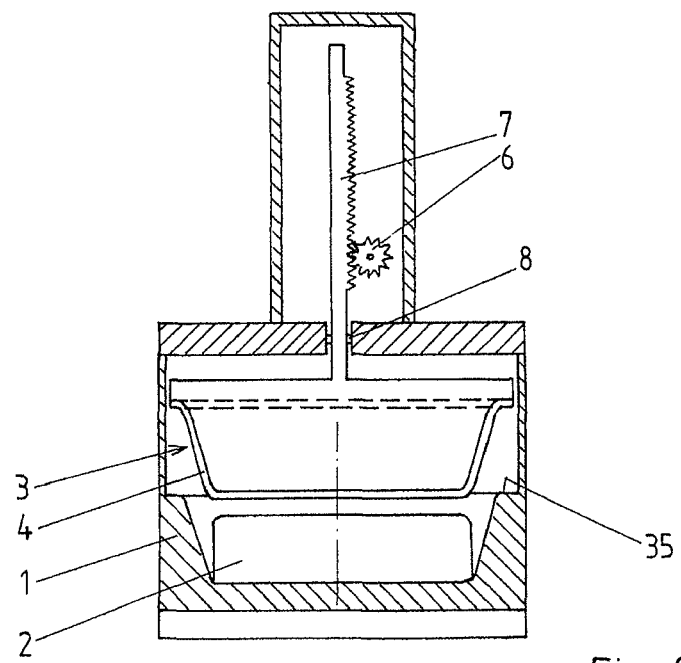

METHOD FOR CONTROLLING OR REGULATING A VACUUM VALVE

CROSS-REFERENCE TO RELATED APPLICATIONS

This application is a continuation of PCT/AT2008/000263, filed Jul. 21, 2008, which claims the benefit of German patent application No. 10 2007 034 926.4, filed Jul. 24, 2007, both of which are incorporated herein by reference as if fully set forth.

BACKGROUND

The invention relates to a method for controlling or regulating a vacuum valve that comprises:
a valve body with a valve opening,
a closing member that can be moved between an open position and a closed position over a closing path for closing the vacuum valve and that closes the valve opening in the closed position, wherein at least one elastic seal is pressed onto a seal face,
an actuator for moving the closing member, and
a control device by which the actuator can be controlled.

Control devices for vacuum valves are known, wherein these control devices control an actuator for opening and closing the closing member and wherein, for activating the actuator, a corresponding operating means, usually compressed air, is fed to this actuator. Here, self-opening and self-closing valves are known in which, in the case of loss of operating means, the open position or closed position of the closing member is maintained by spring elements. In addition to pneumatically driven vacuum valves, electrically driven vacuum valves are also known. It is also known to feed various input signals on the valve state to the control device, in order to realize safety functions, i.e., to prevent or to trigger the opening or closing of the vacuum valve for certain states of the vacuum system.

From U.S. Pat. No. 7,036,794 B2, a method for controlling a vacuum valve is known in which the pressing force acting on the elastic seal is set by the control device as a function of a determined value for the differential pressure between the two vacuum chambers between which the vacuum valve is arranged. In this way, the wear of the elastic seal can be reduced.

SUMMARY

The invention provides expanded possibilities for controlling or regulating a vacuum valve of the type noted above.

This is achieved according to the invention by a method for controlling or regulating a vacuum valve that comprises:
a valve body with a valve opening,
a closing member that can be moved between an open position and a closed position over a closing path for closing the vacuum valve and that closes the valve opening in the closed position, wherein, in the closed position, at least one elastic seal is pressed onto a seal face and wherein, when the closing member is moving from the open position into the closed position, the elastic seal contacts the seal face at a contact point of the closing path,
an actuator for moving the closing member, and
a control device by which the actuator can be controlled, wherein, as a controlling parameter for the control device, the contact point of the closing path at which the elastic seal contacts the seal face and/or the velocity of the closing member at the contact point is used.

The invention touches upon the basic idea that, by using the contact point of the elastic seal on the seal face and/or the velocity of the closing member at that point, an improved control or regulation of the vacuum valve can be performed by the control device.

In the scope of this specification, when the discussion is of a "control device," this term comprises all devices, in particular, electronic devices, by which control processes can be performed in the sense of open control or regulation methods comprising at least one control loop or combinations of these.

In one advantageous embodiment of the invention, the velocity of the closing member with which this closing member approaches the contact point is set by the control device. The velocity of the closing member is here controlled accordingly or advantageously regulated. The velocity of the closing member at the contact point can advantageously be set to different values by the control device as a function of at least one input parameter for the control or regulation. Here it can involve a parameter that can be input into the control device or a parameter that is detected automatically by the control device or an automatically detected variable. Combinations of parameters or variable that can be input manually and detected automatically are also conceivable and possible.

For example, the contact velocity of the elastic seal on the seal face can be set to different values as a function of the (input or detected) material of the elastic seal. The contact velocity was identified as an important load parameter for the elastic seal, wherein, in the case of different seal materials, there may be different maximum contact velocities for an adequate service life. On the other hand, the highest possible contact velocity is desired with respect to the maximum clock cycle of the vacuum valve. These requirements can be optimized by the invention if elastic seals made from different materials are used.

For example, the type of process gas with which the elastic seal comes into contact during the execution of a process in the vacuum installation in which the vacuum valve is used could be used as a different or as an additional parameter, with the contact velocity being set to different values as a function of this parameter. Thus, in the case of an aggressive process gas, the contact velocity could be reduced, in order to achieve a desired service life.

Through a control or regulation of the velocity of the closing member at the contact point, the closing of different parts than the seal could also be optimized, for example, the actuator or the closing mechanism (that is, the gear elements transferring the motion of the actuator to the closing member).

In a different or an additional aspect of the invention, a current value for the position of the contact point within the closing path or the total stroke performed during the closing of the vacuum valve can be detected by the control device at least once, e.g., at the restart of the system, or advantageously repeatedly. Therefore, various control or regulation options are realized individually or in combination, which will be explained below.

Through repeated detection of a current value of the contact point, each detected value of the contact point can be linked with the wear of the elastic seal. Thus, in the case of increasing wear of the seal, the contact point moves towards an increasingly greater distance from the starting point of the stroke performed by the actuator during the closing of the vacuum valve. If a limiting value is exceeded, then an output of a service signal, in particular, an optical and/or acoustic signal, could be realized by the control device, wherein this signal indicates that the elastic seal is to be exchanged.

For example, it is also conceivable and possible to use the already existing wear of the seal as a variable for the control or regulation of the velocity of the closing member on the contact point of the elastic seal on the seal face.

It is also conceivable and possible to change the pressing force acting on the elastic seal at the closed position of the closing member as a function of the detected contact point. Therefore, the pressing force could be increased, for example, in the case of increasing wear of the seal, in order to keep the leakage rate below a desired value.

By determining a current value of the contact point, the closing member can be braked at a short distance before the actual contact point, in order to set its velocity at the contact point to a desired value.

In another variant of the invention, it could be provided that an efficiency factor of the actuator and gear elements that transfer the movement of the actuator to the movement of the closing member is detected by the control device by detecting the time within which the contact point is reached during the closing of the vacuum valve. This efficiency factor could be linked with the wear of the actuator and these gear elements or bearing elements for these parts, wherein an especially optical and/or acoustic service signal could be output by the control device when the permissible wear is exceeded. This indicates that maintenance of the actuator, the gear elements, or the bearing elements is to be performed.

The method according to the invention can be used in connection with very different types of valves. For example, the valve could be constructed in a way in which the entire closing movement between the open position and the closed position of the closing member takes place in a straight line for all parts of the closing member. Such vacuum valves are known, for example, from U.S. Pat. Nos. 4,809,950, 6,685,163 or 4,921,213.

The method can also be used, for example, in valves that are constructed like slide valves, as known, for example, from U.S. Pat. Nos. 4,052,036 or 4,470,576.

A construction of the vacuum valve like a butterfly valve, for example, is also conceivable and possible. Such butterfly valves are known, for example, from U.S. Pat. Nos. 4,634,094 or 6,494,434.

Furthermore, a construction of the vacuum valve, for example, as an L-valve is also conceivable and possible. Such an L-valve is known, for example, from U.S. Pat. No. 6,431,518. The individual moving components of the L-movement can here be caused by the same actuator or by different actuators.

Furthermore, a construction of the vacuum valve in which the closing member has a V-shaped construction is also possible, for example, and has seals on both sides that contact corresponding congruent seal faces, as emerges from U.S. Pat. No. 6,367,770.

BRIEF DESCRIPTION OF THE DRAWINGS

Additional advantages and details of the invention will be explained below with reference to the accompanying drawing.

Shown in the drawings are:

FIG. 1 is a schematic diagram of a vacuum valve arranged between two vacuum chambers, the vacuum valve shown schematically in cross section along the axis of the valve opening in the closed position of the closing member, FIG. 2 is a schematic section of the vacuum valve from FIG. 1 in the direction perpendicular to the axis of the valve opening in the open position of the closing member.

DETAILED DESCRIPTION OF THE PREFERRED EMBODIMENTS

Figure 3:
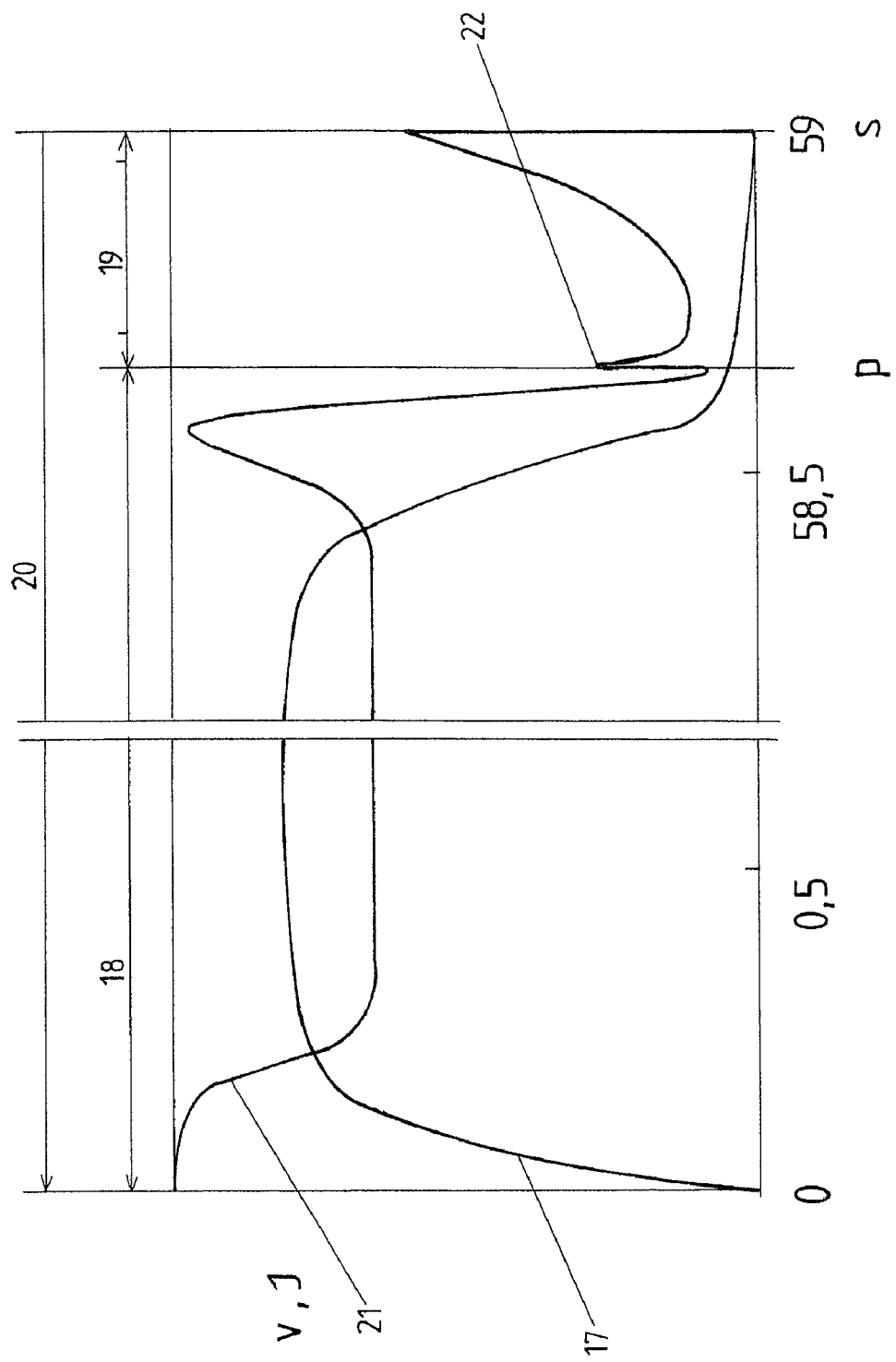
FIG. 3 is a diagram of the velocity of the closing member and the current intensity of the actuator as a function of the path of the closing member.

One example for a vacuum valve in which the method according to the invention can be executed is shown schematically in FIGS. 1 and 2. The vacuum valve comprises a valve body 1 with a valve opening 2 constructed in the form of a passage channel and a closing member 3. The closing member 3 opens the valve opening 2 in an open position (FIG. 2) and closes the valve opening 2 in a closed position (FIG. 1). In the closed position of the closing member 3, an elastic seal 4 is pressed onto a seal face 35. The seal 4 is here arranged on the closing member 3 and the seal face 35 on the valve body 1. A reversed arrangement is likewise possible.

In this embodiment of the vacuum valve, the seal 4 has sections that lie in two parallel planes set apart from each other in the direction of the longitudinal axis of the valve opening 2 and that are connected to each other by connecting sections. Such a construction of a closing member 3 and the seal face 35 of the valve body 1 is known and described, for example, in U.S. Pat. No. 4,809,950.

An actuator 5 that is constructed in this embodiment in the form of an electric motor, for example, an AC servomotor or DC servomotor, or a stepper motor, is used for moving the closing member 3 from its open position shown in FIG. 2 into its closed position shown in FIG. 1. The adjustment of the closing member 3 by the actuator 5 is realized by gear elements located in-between, in the illustrated embodiment, a pinion 6 and a toothed rack 7 are shown schematically. The closing member 3 is mounted on an extension of the toothed rack 7. This extension of the toothed rack 7 forming a valve rack is sealed in this way (seal 8) and introduced movably into the vacuum region of the vacuum valve.

The actuator 5 is triggered by a control device 9, wherein the movement of the actuator 5 is controlled by the control device 9.

Several actuators 5 triggered by the control device 9 could also be provided.

In the illustrated embodiment, the position of the closing member 3 is detected by a sensor 10, for example, through the detection of coding arranged on the toothed rack 7. The detected position of the closing member 3 is fed to the control device 9 for constructing a control loop. In this embodiment, the movement of the closing member 3 is regulated, as is preferred.

Furthermore, a brake or holding device 36 is provided by which the closing member 3 can be fixed at least in the closed position, advantageously also in other positions, for example, in the open position or at any position of its closing path. The holding device 36 that is shown only schematically in FIG. 1 and that is activated by the control device 9 can have a self-closing construction in a favorable way, i.e., when an operating means, e.g., current or compressed air, is supplied, it is opened and without the supply of operating means, it closes. For example, a spring device could be provided here that presses a friction element 37 onto a part, e.g., the toothed rack 7, connected to the closing member 3.

For example, electromechanical, electromagnetic holding devices 36 or pneumatic holding devices 36 could be used.

The vacuum valve is arranged between vacuum chambers 11, 12 and thus communication between the vacuum chambers 11, 12 or a gas-tight closure between the vacuum chambers 11, 12 is possible via the vacuum valve. For example, a process could be performed in one of the vacuum chambers 11 on at least one work piece to be processed, for example, a wafer. The other vacuum chamber 12 could be, for example, a transfer chamber.

Advantageously, pressure sensors 13, 14 also shown schematically in FIG. 1 are provided by which the prevailing pressure in each vacuum chamber 11, 12 can be detected. The pressure measurement values are fed to the control device 9.

The control device 9 furthermore has advantageously an input device 15, for example, a keyboard, for the input of data, for example, input parameters for the control or regulation.

Furthermore, the control device 9 advantageously has an output device 16, for example, a display or a screen. An acoustic output could also be provided.

In FIG. 3, a diagram is shown in which the velocity v of the closing member 3 as a function of the closing path s is shown as the curve 17. At the beginning of the closing path s, the velocity v initially increases to a value that is essentially maintained across a large part of the closing path. Before the end of the closing path, the velocity v decreases, in turn, until at the end of the closing path at which the elastic seal 4 is pressed with the desired force onto the seal face, the stoppage of the closing member 3 is achieved.

The point at which the elastic seal 4 is set on the seal face is drawn in FIG. 3. The closing path up to this point p could also be designated as the closing stroke 18 and the closing path from this point p up to the setting could be designated as the sealing stroke 19. The entire closing path could also be designated as the total stroke 20.

In the shown embodiment, the total closing path s is specified, as an example, with 59 mm.

The velocity v of the closing member 3 with which this member approaches the contact point p is set by the control device 9. The magnitude of this velocity v at the contact point p (=contact velocity) is here set as a function of at least one input parameter for the control or regulation.

Advantageously, the material from which the elastic seal 4 is made is used as such an input parameter. In particular, elastic seals made from FKM (fluoroelastomer, Viton), FFKM (perfluoroelastomer), or silicone are known. For example, for a seal made from an FFKM material, a lower contact velocity could be selected than for a seal consisting of FKM or silicone.

The material from which the seal 4 is made can be input into the control device 9 by the input device 15. For example, the seal 4 could also be provided with corresponding coding that is detected by a sensor.

As an input parameter as a function of which the contact velocity is set to different values, the type of process gas could be used instead or in addition, with this process gas being used, in particular, in the vacuum chamber 11 representing the process chamber and coming in contact with the seal 4.

The contact velocity could also be selected as a function of an input value for the permissible particle formation. The higher the contact velocity is, the more particles are formed, wherein certain applications are sensitive relative to particle formation.

The control of the velocity of the closing member 3 during the closing of the vacuum valve is realized through a corresponding control of the actuator 5 by the control device 9. Advantageously, the actual value of the velocity is detected here, in the shown embodiment by means of the sensor 10, wherein a control loop for regulating the velocity to a desired value is constructed.

In FIG. 3, the magnitude of the current I consumed by the actuator versus the closing path s is also shown as the curve 21. After the initial acceleration of the actuator 5, the current I decreases to a value that is essentially constant across a large part of the closing path (advantageously, the variation equals less than 10%). For braking the closing member 3 shortly before reaching the contact point p, the supplied current intensity initially increases, in order to subsequently decrease, in turn. With the contact of the seal 4 on the seal face, at the contact point p there is also a peak 22 (=an increase and a decrease of the current intensity across a relatively short interval) of the current intensity. Subsequent to this peak, the current intensity I increases with increasing pressure of the elastic seal 4 at the end of the sealing path. In the closed position, the current supply can be switched off after activation of the holding device 36.

Preferably, at least 20%, advantageously at least 40%, of the time required for the total closing path s is dedicated to the last section of the closing path s that extends across twice the sealing stroke 19.

From the peak 22 of the current intensity, the contact point p could be detected by the control device 9.

The contact point p is detected in a training closing process at least at the restart of the system and at the exchange of a component that is essential for the value of the contact point p, e.g., the closing member 3, its seal 4, the actuator 5, a gear element connected between the actuator 5 and the closing member 3, or the control device 9 itself. In this way, the velocity control or regulation of the closing member 3 can also be optimized.

If the contact point p itself is not detected directly, then the control or regulation of the velocity v of the closing member 3 could also be performed, in order to set this to a desired value at the contact point p, for example, also such that the end point of the closing path is detected and an approximate value for the contact point p is determined from the at least approximately known compression of the elastic seal and the value of the velocity is held constant at the desired value over an adequately large range around the approximately determined contact point.

Preferably, however, a training closing process is performed, as mentioned, at the restart of the system or at the exchange of a component that is essential for the value of the contact point, wherein the value for the contact point is determined from this training process.

Advantageously, however, the position of the contact point p is detected repeatedly, for example, at each (n-th) closing process, with n being a natural number between 1 and 1000.

If the detection of the current value of the contact point p is performed again, then, e.g., the wear of the seal can be determined from the position of the contact point p. Due to wear and incomplete restoration to the original diameter after repeated compression, the contact point p shifts increasingly far away from the starting point of the closing path or another fixed point with respect to the valve body 1 that is crossed when closing the vacuum valve. If the comparison of the detected current value of the contact point with a specified limiting value produces wear that is too great on the elastic seal 4, then a service signal that indicates the requirement for exchanging the elastic seal 4 is output by the control device 9.

If a change is performed on the actuator or a part of the valve mechanism, then the previously existing wear of the seal is stored, in order to be able to determine the still permissible wear for the seal after a training closing process.

If the seal or the closing member with the seal is exchanged, then the wear is reset to the value 0 and a training closing process is performed for detecting the contact point p.

The pressing force exerted on the elastic seal 4 in the closed position of the closing member 3 could also be adapted, for example, as a function of the detected position of the contact point p. Thus, this pressing force could be increased in the case of higher wear, in order to still achieve a desired gas tightness.

From the time within which the contact point p is reached during the closing of the vacuum valve, an efficiency factor of the actuator 5 and the gear elements connected between the actuator 5 and the closing member 3 can be determined by the control device 9. The current intensity I is set to an equal value for each closing process at least over a large part of the closing path, for example, over more than 80% of the closing path, cf. FIG. 3. As a function of the efficiency factor, a greater or smaller velocity v and an associated longer or shorter time span until reaching the contact point p are produced. If too low an efficiency factor is determined, then a service signal is output by the control device 9.

For determining the efficiency factor, the time could also be detected that the closing member 3 needs for traversing a certain section of the closing path for a defined value of the supplied current. The section could be detected, for example, by the sensor 10.

In the closed position of the closing member 3, the pressing force acting on the seal 4 is set to a desired value. The control or regulation of the pressing force can be realized through force or path control or regulation. In the case of force control or regulation, the force exerted by the actuator is set by means of a corresponding supply of the operating means, here the current intensity. The exerted force can be detected, for example, by a strain gauge. In the case of path control or regulation, the magnitude of the sealing stroke 19 is set, in order to achieve a corresponding pressing force acting on the seal 4. For this purpose, the contact point p is detected, for example, as described or optically by a camera. Starting from the contact point p, the closing member 3 is still moved over a section in the direction toward the valve seat, with this section corresponding to the desired sealing stroke.

During closing, when the specified closed position is reached, the holding device (brake) 36 is activated, in order to fix the set pressing force. Then the supply of the operating means, in the present case, the supply of current, can be switched off.

In the case of an elimination of the operating means, through a self-closing construction of the holding device 36, a determination of the closing member 3 at the position at which it is currently located can be performed, which represents a safety feature.

The pressing force acting on the elastic seal 4 in the closed position of the closing member 3 can be set by the control device 9 as a function of the differential pressure acting between the two vacuum chambers 11, 12, as this is known.

Figure 4:
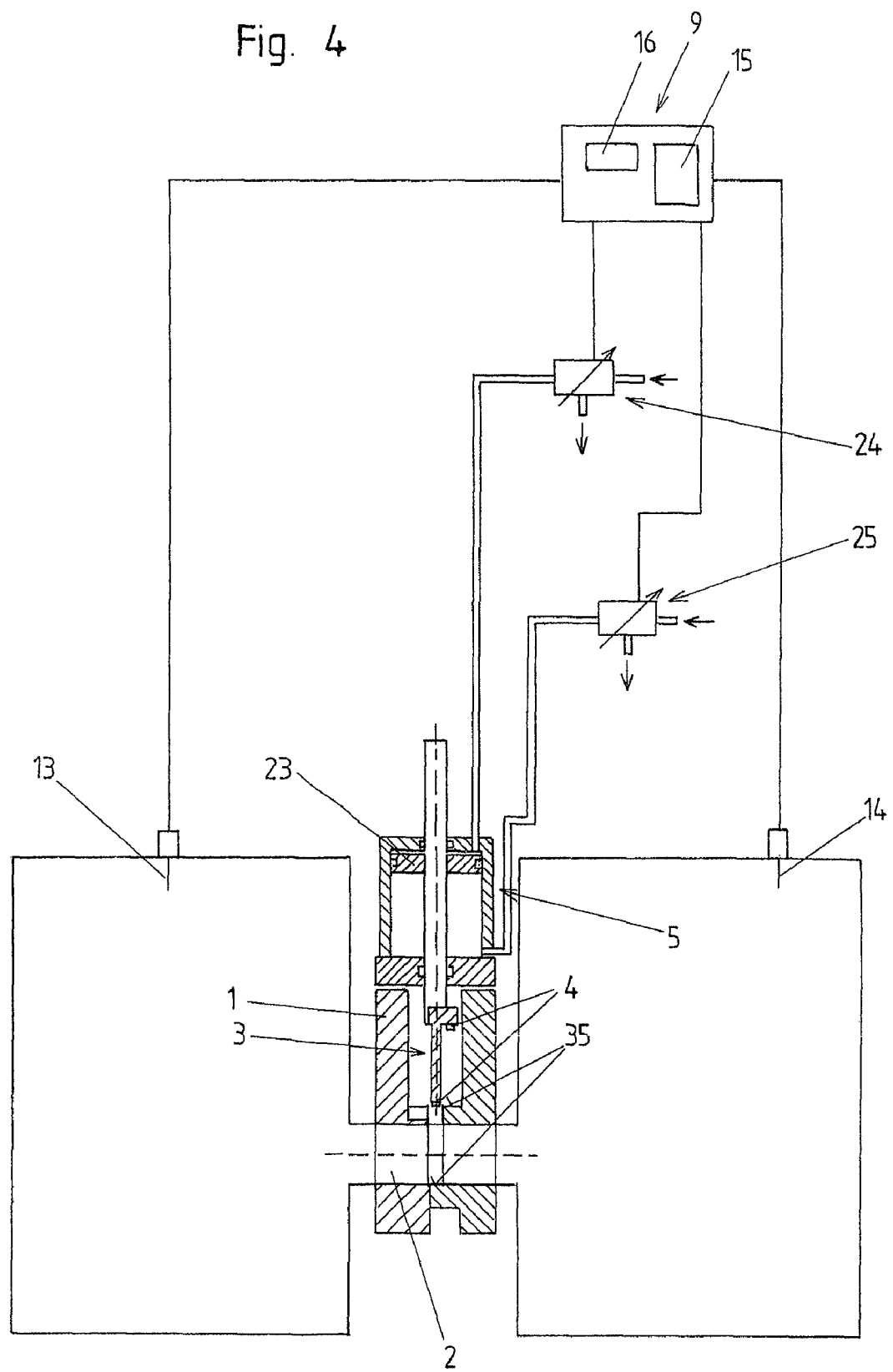
FIG. 4 is a schematic diagram of another embodiment of a vacuum valve that is arranged between two vacuum chambers and that can be controlled or regulated in a way according to the invention.

One embodiment for a pneumatically operated vacuum valve is shown schematically in FIG. 4. Here, compressed air is fed as the operating means to the actuator 5. In order to be able to perform an effective regulation of the velocity of the closing member 3, the piston 23 of the actuator 5 could be loaded simultaneously on both sides with compressed air, wherein the pressure difference in the two cylinder chambers can be set by the control device 9 by corresponding control elements 24, 25.

The contact point p could be optionally detected here from the pressure profile across the closing path s.

Independent of the type of actuator 5 that is used, the contact point p could also be detected, for example, optically by a camera.

In this embodiment, the control or regulation of the vacuum valve could be performed in a way analogous to before with reference to FIGS. 1 to 3, wherein the control or regulation of the closing member 3 is realized, instead of as before by the current intensity, now by pressure or the pressure difference of the operating means.

Figure 5:
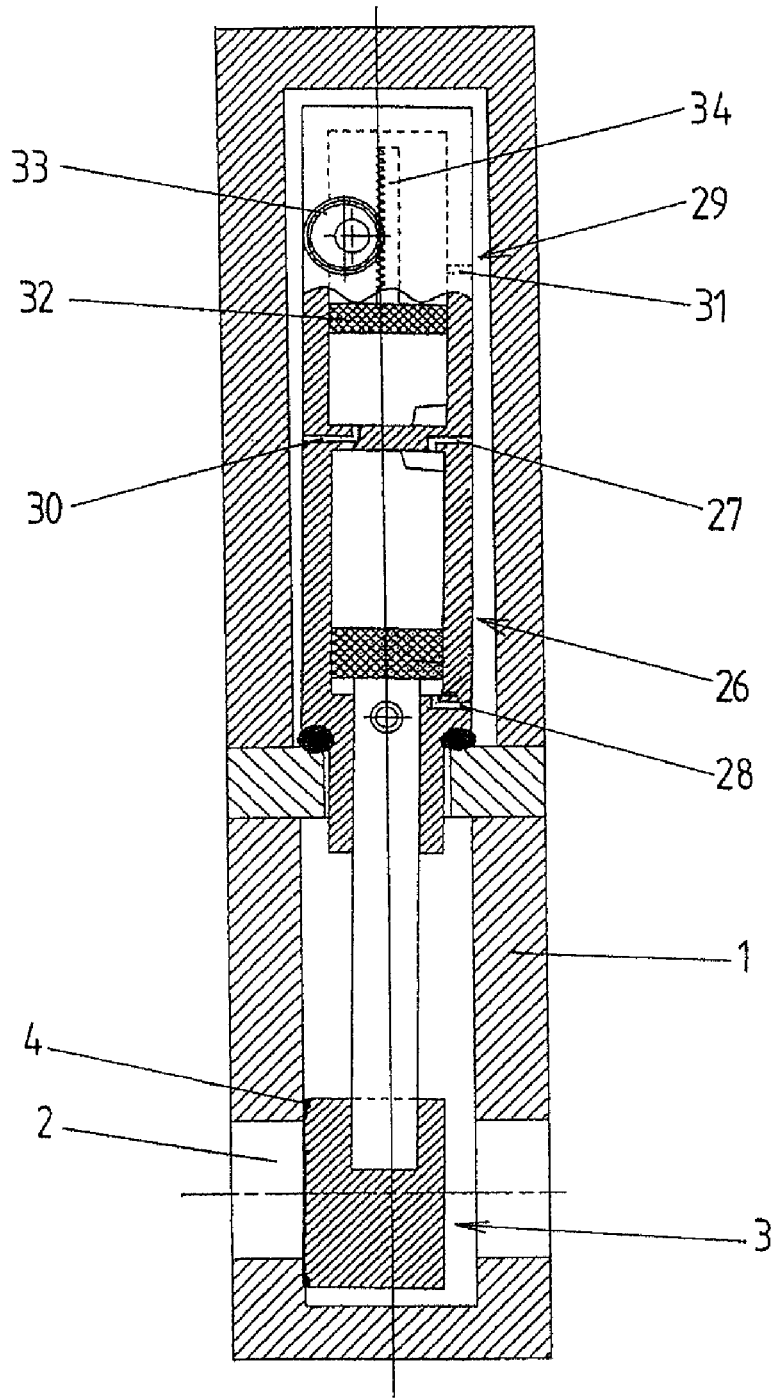
FIG. 5 is a schematic section diagram of another embodiment of a vacuum valve that can be controlled or regulated in a way according to the invention.

The different described aspects of the invention can also be realized for vacuum valves with different constructions. In FIG. 5, an L-valve is shown merely as an example. Through the use of the actuator 26 constructed as a piston-cylinder unit, the closing member 3 is set between its open position and a position that is opposite the seal face but that is still raised from the seal face, for the purpose of charging and bleeding the compressed air lines 27, 28 corresponding to the compressed air. Through use of the actuator 29 that is likewise formed by a piston-cylinder unit, the closing member 3 is pressed onto the valve seat having the seal face, for the purpose of charging or bleeding the compressed air lines 30, 31 corresponding to the compressed air, in order to move the piston 32. The pressing of the seal 4 on the seal face arranged on the valve body 1 is performed through the gear wheel 33 that is positioned eccentrically and that interacts with the toothed rack 34 arranged on the piston 32.

The contact velocity of the seal 4 on the seal face could be varied, in turn, e.g., as a function of the material of the seal 4.

From the determination of the position of the contact point, the wear of the seal 4 can be determined, in turn, in order to output a service signal if the wear is too high.

From the time required until the contact point is reached, an efficiency factor of the mechanism can be determined, in order to output a service signal if the efficiency factor is too low.

In all of the embodiments, by monitoring the force required for adjusting the closing member 3, clamping protection relative to foreign bodies can be provided. In particular, in the case of detection of the contact point p, it can be monitored whether, during closing, a force increase exceeding a specified limiting value occurs before reaching the contact point p, in order to realize such clamping protection.

For detecting the location and/or the velocity of the closing member 3, different types of sensors could be used, for example, optical or inductive sensors.

Fixing the closing member 3 in its closed position could also be achieved, for example, through a self-blocking construction of the movement of the actuator 5 of transferring gear elements (for example, self-blocking spindle-type lifting gear) or the actuator itself or in that gear elements are moved across a dead center point.

LEGEND TO THE REFERENCE NUMBERS

1 Valve body
2 Valve opening
3 Closing member
4 Elastic seal
5 Actuator
6 Pinion
7 Toothed rack
8 Seal
9 Control device
10 Sensor
11 Vacuum chamber 12 Vacuum chamber
13 Pressure sensor
14 Pressure sensor
15 Input device
16 Output device
17 Curve
18 Closing stroke
19 Sealing stroke
20 Total stroke
21 Curve
22 Peak
23 Piston
24 Control element
25 Control element
26 Actuator
27 Compressed air line
28 Compressed air line
29 Actuator
30 Compressed air line
31 Compressed air line
32 Piston
33 Gear wheel
34 Toothed rack
35 Seal face
36 Holding device
37 Friction element

The invention claimed is:

1. Method for controlling or regulating a vacuum valve that comprises:
a valve body with a valve opening,
a closing member that can be moved between an open position and a closed position over a closing path for closing the vacuum valve and that closes the valve opening in the closed position, wherein, in the closed position, at least one elastic seal is pressed onto a seal face and, during movement of the closing member from the open position into the closed position, the elastic seal first comes into contact with the seal face at a contact point of the closing path,
an actuator for moving the closing member, and
a control device by which the actuator is triggered,
wherein the velocity of the closing member at the contact point is used as a controlling parameter for the control device when the control device controls the moving of the closing member from the open position to the closed position.

2. Method according to claim 1, wherein the velocity of the closing member with which the closing member approaches the contact point is set by the control device as a function of at least one parameter or at least one variable.

3. Method according to claim 2, wherein the velocity of the closing member with which the closing member approaches the contact point is set to different values by the control device for different materials of the elastic seal.

4. Method according to claim 2, wherein the velocity of the closing member with which the closing member approaches the contact point is set to different values by the control device for different process gases with which the elastic seal comes into contact.

5. Method according to claim 1, wherein, during the closing of the vacuum valve, at least 20% of the time needed for an entire closing path is used for a last section of the closing path that equals twice a length of the path from the contact point up to the closed position.

6. Method according to claim 5, wherein, during the closing of the vacuum valve, at least 40% of a time needed for an entire closing path is used for a last section of the closing path.

7. Method for controlling or regulating a vacuum valve that comprises:
a valve body with a valve opening,
a closing member that can be moved between an open position and a closed position over a closing path for closing the vacuum valve and that closes the valve opening in the closed position, wherein, in the closed position, at least one elastic seal is pressed onto a seal face and, during movement of the closing member from the open position into the closed position, the elastic seal first comes into contact with the seal face at a contact point of the closing path,
an actuator for moving the closing member, and
a control device by which the actuator is triggered,
wherein the contact point of the closing path at which the elastic seal contacts the seal face is used as a controlling parameter for the control device when the control device controls the moving of the closing member from the open position to the closed position.

8. Method according to claim 7, wherein at least one training closing process is performed by the control device in which at least one value of a parameter used for the control or regulation of the vacuum valve is determined.

9. Method according to claim 7, wherein the contact point in the closing path at which the elastic seal contacts the seal face is detected by the control device at least once.

10. Method according to claim 9, wherein the contact point is detected repeatedly by the control device.

11. Method according to claim 7, wherein the contact point of the elastic seal on the seal face is determined from a profile reproducing a supply of an operating means to the actuator over the closing path.

12. Method for controlling or regulating a vacuum valve that comprises:
a valve body with a valve opening,
a closing member that can be moved between an open position and a closed position over a closing path for closing the vacuum valve and that closes the valve opening in the closed position, wherein, in the closed position, at least one elastic seal is pressed onto a seal face and, during movement of the closing member from the open position into the closed position, the elastic seal first comes into contact with the seal face at a contact point of the closing path,
an actuator for moving the closing member, and
a control device by which the actuator is triggered,
wherein the contact point of the closing path at which the elastic seal contacts the seal face is used as a controlling parameter for the control device,
wherein the contact point in the closing path at which the elastic seal contacts the seal face detected by the control device at least once, and
wherein each detected value of the contact point is compared with a limiting value by the control device.

13. Method according to claim 12, wherein a service signal is output by the control device as a function of a result of the comparison.

14. Method for controlling or regulating a vacuum valve that comprises:
a valve body with a valve opening,
a closing member that can be moved between an open position and a closed position over a closing path for closing the vacuum valve and that closes the valve opening in the closed position, wherein, in the closed position, at least one elastic seal is pressed onto a seal face and, during movement of the closing member from the open position into the closed position, the elastic seal first comes into contact with the seal face at a contact point of the closing path, an actuator for moving the closing member, and a control device by which the actuator is triggered, wherein the contact point of the closing path at which the elastic seal contacts the seal face is used as a controlling parameter for the control device, wherein the contact point in the closing path at which the elastic seal contacts the seal face detected by the control device at least once, and wherein an efficiency factor of the actuator and gear elements that transfer the movement of the actuator to the closing member is detected by the control device through determining a time within which the contact point is reached during the closing of the vacuum valve and the efficiency factor is linked with wear of the actuator and the gear elements.

15. Method for controlling or regulating a vacuum valve that comprises:

a valve body with a valve opening, a closing member that can be moved between an open position and a closed position over a closing path for closing the vacuum valve and that closes the valve opening in the closed position, wherein, in the closed position, at least one elastic seal is pressed onto a seal face and, during movement of the closing member from the open position into the closed position, the elastic seal first comes into contact with the seal face at a contact point of the closing path, an actuator for moving the closing member, and a control device by which the actuator is triggered, wherein the contact point of the closing path at which the elastic seal contacts the seal face is used as a controlling parameter for the control device, and wherein the contact point is determined from a profile of a current intensity of current fed to the actuator which is electrically operated over the closing path of the closing member.

* * * * *